Sept. 8, 1964  C. H. ANDERSON  3,147,665
PHOTOCOPY MACHINE
Filed May 7, 1962  5 Sheets-Sheet 4

INVENTOR.
CHARLES H. ANDERSON
BY Barnes + Seed
ATTORNEYS

Sept. 8, 1964    C. H. ANDERSON    3,147,665
PHOTOCOPY MACHINE
Filed May 7, 1962    5 Sheets-Sheet 5
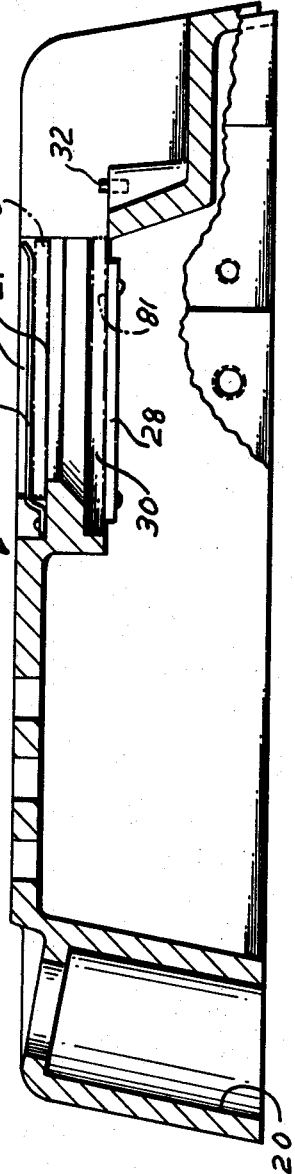
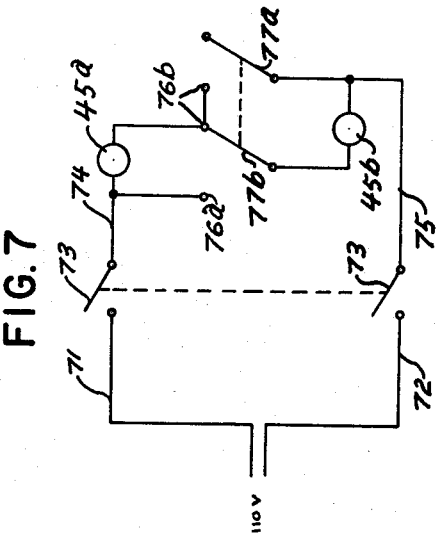
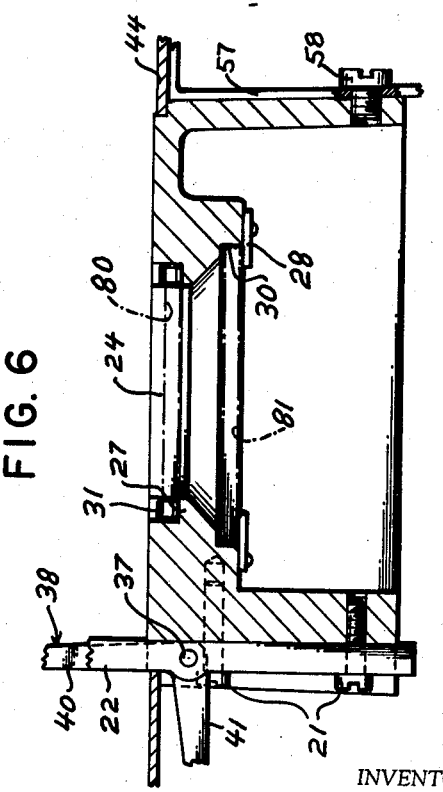
INVENTOR.
CHARLES H. ANDERSON
BY Barnes & Seed
ATTORNEYS United States Patent Office 3,147,665
Patented Sept. 8, 1964

3,147,665
PHOTOCOPY MACHINE
Charles H. Anderson, Federal Way, Wash., assignor to United States Projector and Electronics Corporation, Federal Way, Wash., a corporation of Washington
Filed May 7, 1962, Ser. No. 192,677
4 Claims. (Cl. 88—24)

This invention relates to a photocopy machine and more particularly to such a machine which is able to photograph on a film strip either larger copy material such as that displayed on 8½" by 11" sheets, or smaller photographic transparencies such as 35 millimeter slides.

The recording of material on film strips (usually reels or cartridges of 16 millimeter film) for microfilming, sequence filming, audio-visual training, or simply as a matter of general convenience is becoming increasingly common for both personal and business use. To examine or display such recorded material, the film is placed in a proper viewer or projector, where frames can be rapidly passed over, and any selected frame can be shown for any desired length of time. Because of the very small cost per unit frame (including both film and developing cost), this is a quite inexpensive means of recording large quantities of information in a manner in which such information is easily stored and readily available.

Most prior art photocopy machines are somewhat complex and require a fair degree of skill and manipulation on the part of the operator to insure that the light, the lens opening, the focal distance, shutter speed, etc., are at the proper settings. Both the expense of such prior art machines and the complexity of operation, as well as other factors, make such machines impractical for the more limited needs of a great many people.

In view of this, it is a principal object of this invention to provide a photocopy machine which has an attractive overall appearance, is extremely simple to operate, and is capable of photographying both copy material that is displayed on a relatively larger predetermined area and also smaller photographic transparencies such as 35 millimeter slides.

It is also an object to provide a machine of simple and sturdy construction the parts of which are so arranged that it is practical and economical to manufacture and assemble such parts within the required tolerances so that the machine will function in the desired manner.

It is a further object to provide a simple and easily workable illuminating means for the machine, which will provide in a convenient manner a smaller degree of illumination by which the operator can arrange the copy material and will also provide in an equally convenient manner a greater intensity of illumination in a manner to allow both the larger copy material and the smaller transparencies to be properly photographed.

Other more particular objects and advantages of the invention will, with the foregoing, appear and be understood in the course of the following description and claims, the invention consisting in the novel construction and in the adaptation and combination of parts hereinafter described and claimed.

In the accompanying drawings:

FIG. 5 is a longitudinal sectional view taken on line 5—5 of FIG. 4.

FIG. 6 is a fragmentary transverse sectional view taken on line 6—6 of FIG. 4; and FIG. 7 is a schematic drawing of the electrical wiring of this machine.

Figure 1:
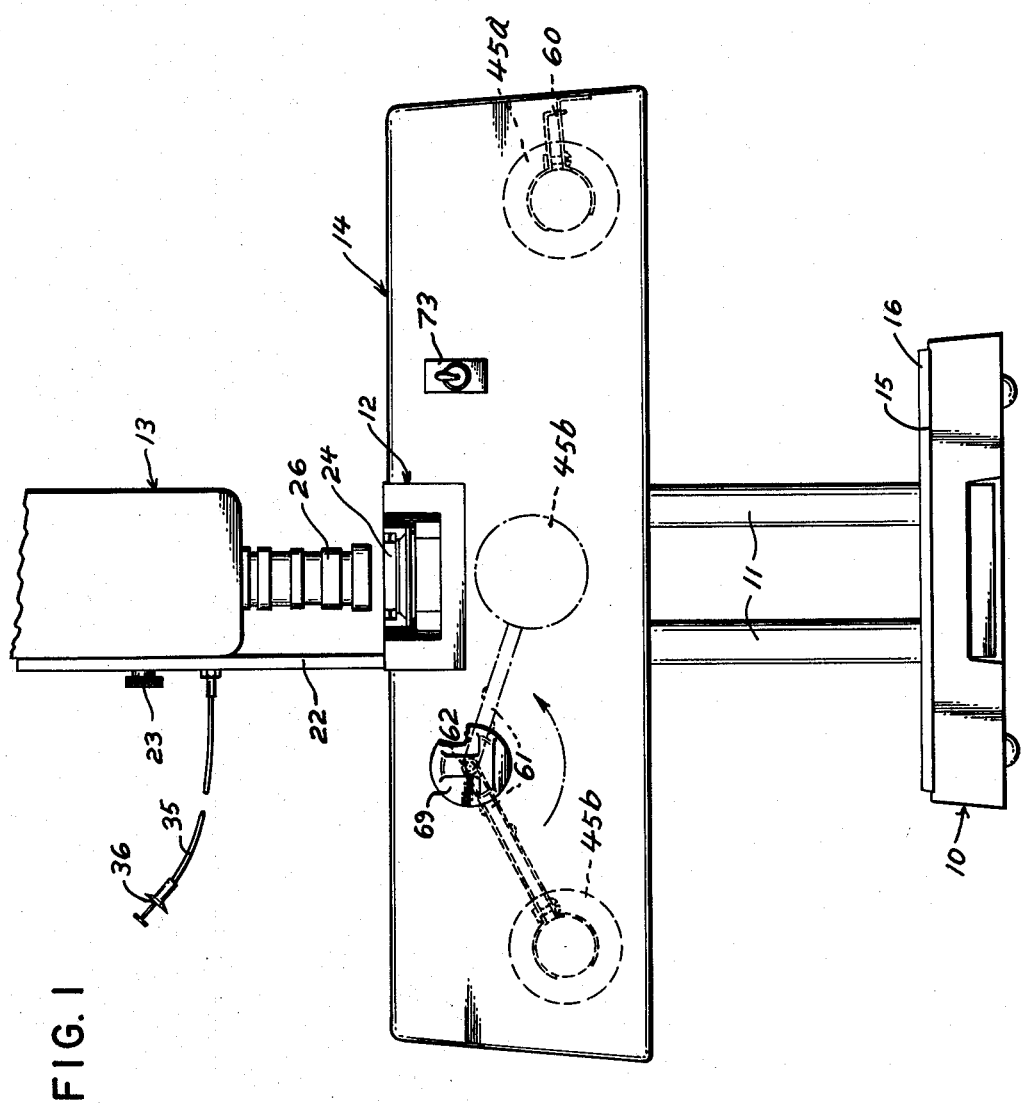
FIGURE 1 is a front elevational view of a photocopy machine embodying preferred teachings of my invention.
Figure 2:
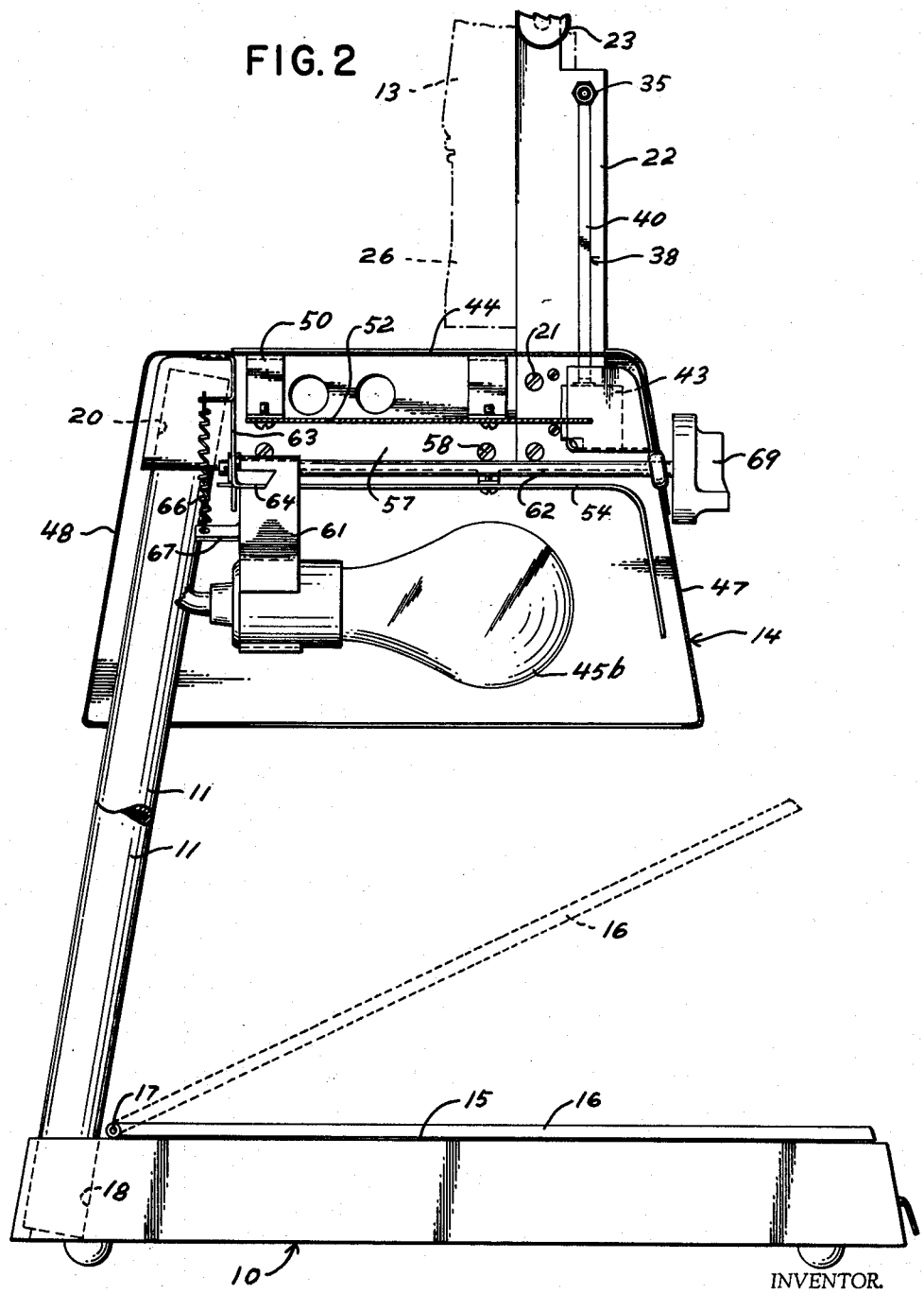
FIG. 2 is a side elevational view thereof.
Figure 3:
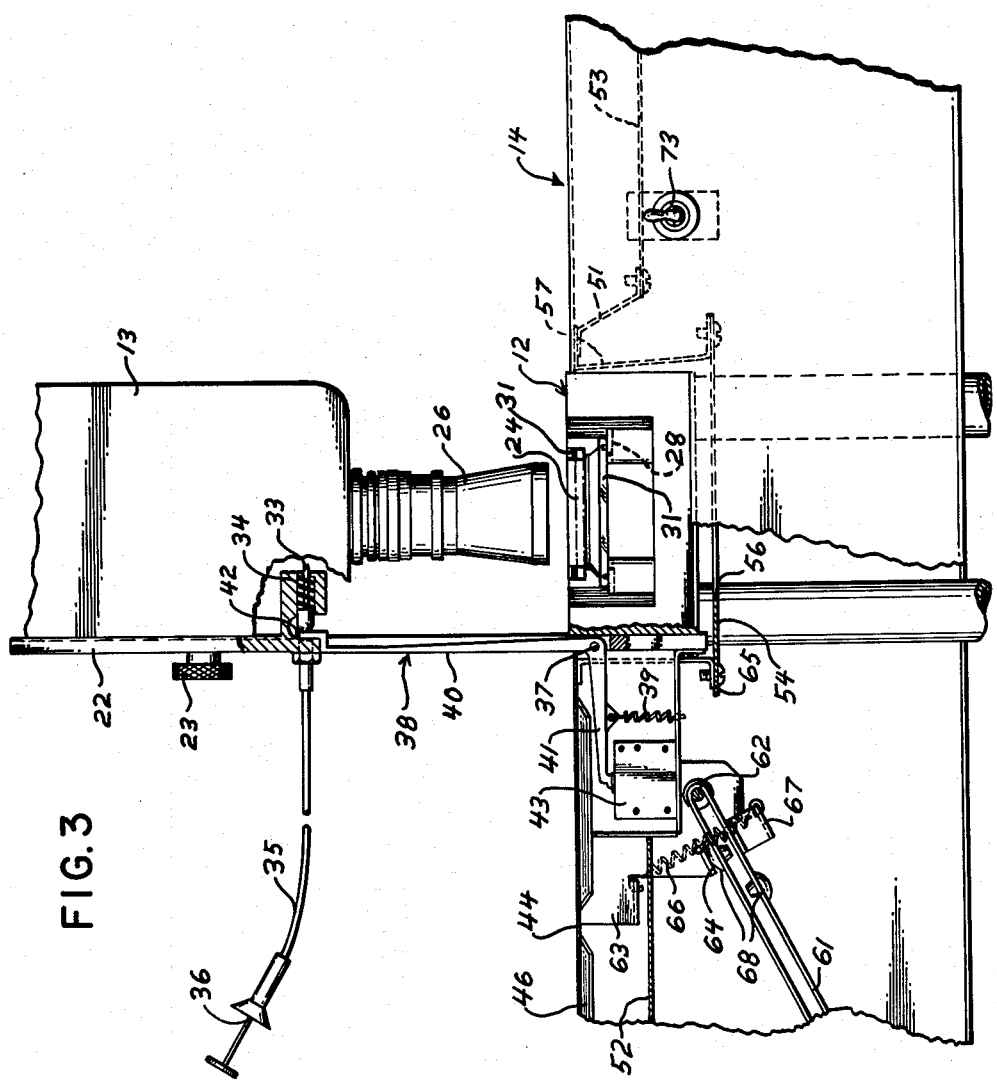
FIG. 3 is a fragmentary front elevational view of the upper center portion of the machine, having parts of the cover structure and mounting post broken away.
Figure 4:
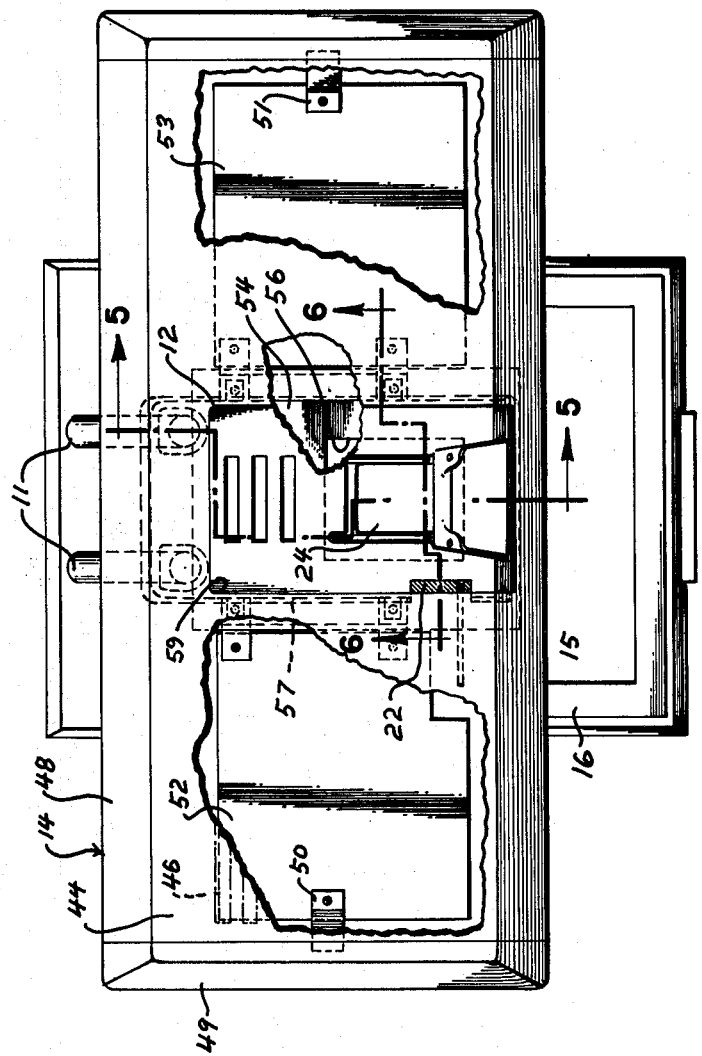
FIG. 4 is a top plan view of the machine with parts of the cover structure being broken away.

Referring to the accompanying drawings, it can be seen that the photocopy machine shown therein has the overall appearance of a desk lamp, and comprises a base 10 of a generally rectangular configuration, having two tubular column members 11, which rise from the base to support at their upper ends a center casting 12. This center casting in turn supports thereabove a camera 13 and also supports a laterally extending hood 14, the hood and the center casting forming a cover structure for the machine.

The upper surface 15 of the base member 10 is planar and is so arranged as to have displayed thereon 8½" by 11" copy material, this requiring that the rectangle defined by the perimeter of this upper base surface be moderately larger than the 8½" by 11" dimensions of the copy material. So that such copy material may be properly secured in its displayed position, there is provided a rectangular border frame 16 which reaches along the perimeter of upper surface 15 of the base member. This frame is hinged to the rear of the base member at 17, so that the front of the frame may be swung upwardly to allow the copy material to be slipped into place, and then lowered to hold this copy material along the edge portions thereof so that it lies evenly on the base surface 15.

The rear of the base member 10 is formed with two sockets 18, each arranged to receive therein the lower end of a related column 11, while the upper end of each column fits into a related one of two sockets 20, formed at the rear of the center casting 12, this arrangement insuring that the center casting 12 is rigidly mounted at a predetermined location above the base 10. Upstanding from the front left side of the casting 12 and fastened thereto by screws 21, is a mounting post 22, to which is removably secured by a knurled screw 23 the camera 13 so that the lens 26 of the camera is centered over the base 10. The front center portion of the casting is formed with a cut-out 24 which provides a through opening through which the downwardly directed lens 26 of the camera is able to have an unobstructed view of copy material displayed on the base surface 15.

To provide for the proper mounting and photographing of a 35 mm. slide, the cut-out 24 is arranged to open to the front and has each of its side walls formed with an upper horizontal ledge 27, and each lower side wall portion arranged with a bottom strip 28 to form a related one of two inwardly facing opposed channels 30. The two ledges 27 each have a spring finger 31 mounted thereon so that a 35 millimeter slide may be conveniently inserted into this cut-out and thus into the view path of the camera, with the edge portions of the slide resting on the ledges and with the spring fingers 31 holding the slide in place. The channels 30 cooperate to form a slideway to receive an obscure glass plate moderately larger than the 2" x 2" dimension of the 35 mm. slide, which plate serves to provide a background of uniform illumination below the slide (a function which will be described hereinafter more fully). Mounted in the casting, each at the forward end of a related channel 30, are two short pins 32 arranged to prevent the glass plate from slipping out of the slideway 30–30.

The camera's trigger mechanism comprises a pin 33 slidably mounted within the camera and urged outwardly therefrom by means of a compression spring 34. To activate this trigger mechanism, there is provided a flexible tube 35 which sleeves onto a wire or cable (not shown), one end of which is attached to a small thumb operated plunger 36. By depressing the plunger 36, the wire is caused to move inwardly against the pin 33 so as to operate the shutter mechanism of the camera.

Pivotally mounted at a point 37 at the lower end of the post 22 and urged counter-clockwise by a spring 39, is a lever member 38, comprising an upstanding arm 40 and a lateral arm 41. The end tip of the arm 40 is operatively connected at 42 to the pin 33, so that the lever member 38 is caused to pivot clockwise through a small arc when the plunger 36 is depressed to operate the camera. This clockwise movement of the lever 38 causes the arm 41 to lift so as to operate a double-pole double-throw micro-switch 43 which in turn operates the lighting means of the machine in a manner to be disclosed hereinafter.

The hood 14 is relatively narrow from front to rear and has its greatest dimension between the sides so that each end portion extends a moderate distance beyond the base 10. The roof 44 of the hood is co-planar with the top surface of the casting 12 and is formed with a plurality of venting slots 46 so that air circulation therethrough will dissipate the heat created by the lamps 45 (to be described hereinafter) contained by the cover structure. Depending from this roof are the front, back, and side walls of the hood, numbered 47, 48 and 49, respectively.

Spaced a moderate distance below the roof 44 and secured thereto by brackets 50 and 51 are right and left horizontal baffles 52 and 53, respectively, which shield the roof of the hood from the lamps 45. A center baffle 54 is secured to the hood at a location directly below the center casting 12, this baffle having an opening 56 directly beneath the camera lens 26 to allow the lens to properly view the base display surface 15. The brackets 57 which connect this center baffle to the hood reach on either side of the casting, and fastening means (shown schematically at 58) are or may be arranged to secure these brackets to the casting as one means of fixing the hood 14 thereto. The hood roof 44 has a center opening 59 to accommodate the center casting 12.

The illuminating means for this machine comprises right and left lamps 45a and 45b, mounted within, and normally at opposite ends of, the hood 14. The right hand lamp 45a is held in this end location by means of brackets 60 secured to one side wall 49 of the cover. The left hand lamp 45b is secured to an arm 61 fixed to a longitudinal pin 62 mounted on a bracket 63 for swing motion in a transverse plane, and rigidly secured to a knob 69 at the front of the hood. The arm 61 is provided with two stops, the left stop 64 being on the bracket 63 and serving to locate the lamp 45b at its end location in the cover, and the second 65, being the left edge of the center baffle 54 and functioning to locate the lamp at a location directly below the center baffle opening 56. A tension spring 66 is attached by one end to a bracket 67 fastened to the arm 61 a short distance from its pivot, and by the other end to the fixed bracket 63. The spring has a center throw action (i.e. it is so arranged that as the arm 61 passes through its arc from stop 64 to 65, the spring 66 is stretched to the fullest extent at an intermediate point along this arc of travel). Thus when the arm is bearing against either stop 64 or 65 the tension spring serves to hold the lamp 45b in place either at its end location in the cover, or directly below the camera lens 26. Small bumpers 68 are provided on the arm 61 to cushion the arm as it contacts either of the stops 64 or 65.

The wiring arrangement for the lamps 45a and 45b is shown diagrammatically in FIG. 7. A plug (not shown) is adapted to be inserted into a conventional wall socket connected to a 110 volt power source, and has extending therefrom two leads 71 and 72 which run up through one of the tubular columns 11 to the two contacts of a double-pole, single-throw toggle switch 73, which for convenience of operation is mounted on the right front portion of the cover 11. In closed position, the switch 73 causes leads 71 and 72 to come into contact with, respectively, leads 74 and 75. Lead 74 reaches to one contact 76a of the double-pole, double-throw micro-switch 43, and also leads through lamp 45a to a second contact 76b of the switch 43. Lead 75 reaches to a switch blade 77a, and also connects through lamp 45b to a second switch blade 77b.

In normal operating position (shown in FIG. 7), the micro-switch 43 is so arranged that switch blade 77b connects to contact 76b. Thus current will pass through the lamps 45a and 45b in series, the course of the current being through leads 71 and 74, lamp 45a, through switch blade 77b, thence through lamp 45b, and back to the other terminal of the voltage source by way of the lines 75 and 72. Movement of the micro-switch to its other position, where blades 77b and 77a make contact at, respectively 76a and 76b, will cause current to flow in parallel through both lamps 45a and 45b, the course of the current being through lines 71 and 74, wherefrom the current branches to flow on one path through lamp 45a thence through switch blade 77a and back to the voltage source through lines 75 and 72, and on another path through contact 76A, switch blade 77b and thence through lamp 45b to likewise connect to the other terminal of the voltage source through lines 75 and 72. Since, with the lamps connected in parallel, the voltage drop across each lamp will be doubled over the voltage drop of each lamp connected in series, the resultant intensity of illumination with the lamps in parallel will be four times the intensity with the lamps connected in series.

The lever member 38 in the camera mounting post 22 is so arranged that in its normal position the switch 43 is in its series connected position, but when the plunger 36 is depressed to operate the camera and thus move the lever 38, the switch 43 is moved to its parallel connected position. The result is that when the operating mechanism of the camera is activated, the illumination emitted by the lamp is raised to four times its normal intensity so that there is the correct amount of light to allow a proper photograph to be taken.

As before stated, the machine is designed to copy only material displayed on the base surface (this material generally being 8½" by 11" sheets), or to copy photographic transparencies (usually 35 mm. slides) mounted on 2" by 2" cards. In operation, the switch 73 is moved to its closed position to send current through lamps 45a and 45b, which being connected in series, provide light of a moderate intensity, so that there is sufficient illumination, but no severe glare as the copy material is being arranged. The camera is mounted on the post 22, the shutter speed, lens opening, and focal distance of the camera always remaining at the same predetermined setting.

If it is desired to photograph a sheet to be displayed on the base 10, this sheet is inserted on the top surface 15 of the base to be held in place by means of the border frame 16. The lamp 45b is swung to its end position so that the two lamps 45a and 45b cast light upon the copy material at an oblique angle therewith so that very little of the light is reflected upwardly into the lens of the camera. The operating mechanism of the camera is triggered by depressing the plunger 36, which not only activates the shutter mechanism of the camera but also moves the lever 38 which moves the micro-switch 43 from its series connected position to its parallel connected position. Thus at the instant during which the picture is being taken, the lamps 45a and 45b, being then connected in parallel, give four times the normal amount of illumination, this being the predetermined intensity of illumination for the proper photographing of the copy material. After the plunger 36 is released, the lever 38 springs back to move switch 43 to its series connected position.

If it is desired to photograph a 35 millimeter tranparency, this transparency (indicated at 80) being mounted in a two inch by two inch card is slipped into the cutout opening 24 so as to rest on the ledges 27 and be held in place by the spring fingers 31. A glazed (i.e. obscure) glass plate (indicated at 81) is inserted into the slideway 30—30, and the lamp 45b is swung over to the center position so that said lamp is directly below the glass plate. A lens attachment (not shown) is inserted over the camera lens so as to bring the focal plane of the camera to coincide with the plane occupied by the transparency to be copied. Depressing the plunger 36 of the trigger mechanism activates the shutter mechanism of the camera and also, as described in the above paragraph, causes the lamp 45b to give light at four times its normal intensity. Thus the proper amount of light passes through the glass plate, which diffuses the light in a manner to provide a uniform illuminating background for the photographic transparency mounted in the slideway 30—30.

In view of the close distance of the transparency to the camera lens, the relative position of the camera lens with respect to the transparency is extremely critical, requiring that the center casting 12, the post 22, and the camera case be assembled within quite close tolerances. Since cameras, even of exactly the same make and style, vary as to the precise location of the lens with respect to the camera case, it is desirable that the same camera be used in conjunction with any one machine, to avoid variations in the distance from the slide to the camera lens.

It is believed that the invention will have been clearly understood from the foregoing detailed description of my now-preferred illustrated embodiment. Changes in the details of construction may be resorted to without departing from the spirit of the invention and it is accordingly my intention that no limitations be implied and that the hereto annexed claims be given the broadest interpretation to which the employed language fairly admits.

I claim:

1. A copying device for both opaque and transparent copy materials comprising, a base adapted to display opaque copy material thereon, a hood supported from said base in a manner to have a predetermined location above said base and having a central cutout, a pair of illuminating means mounted within said hood on opposite sides of said cutout so that light from said illuminating means is directed onto said opaque copy material from two locations above and on either side thereof, said cover structure serving as a shade against said light and serving to direct such light toward opaque copy material displayed on said base so that said material can be photographed, means to mount a camera directly above said cutout in a manner that said camera is able to photograph said opaque copy material, and holding means on said hood to mount transparent copy material in adjacent registration with said cutout in a manner that said camera is able to photograph the transparent copy material, one of said illuminating means being movable from a respective side of said cutout to an alternative position arranged to direct light from below said holding means in a manner to illuminate said transparent copy material sufficiently to be photographed.

2. The structure of claim 1 in which said illuminating means are adapted to emit light of relatively moderate intensity so that it is comfortable for human vision and also to be able to emit light of a greater intensity that is sufficient to enable said copy materials to be properly photographed, and a power circuit including switch means to operate said illuminating means such that light of either intensity may be emitted, said switch means being arranged with respect to the operating mechanism of said camera in a manner that when said camera mechanism is triggered said switch means causes said illuminating means to emit light of said greater intensity.

3. The structure of claim 1 in which a slideway is mounted on said hood beneath said holding means to receive a glazed plate in registration with said cutout for diffusing light passing therethrough.

4. In combination with the structure of claim 1, a lever arranged with respect to said camera so that when the trigger mechanism thereof is operated, said lever is caused to move, and a power circuit including a switch operatively connected to said lever, said switch in one position connecting said illuminating means in series to a power source and in a second position connecting illuminating means in parallel to said power source, said lever being so arranged that when the camera trigger mechanism is operated, said switch is moved from the series connected position to the parallel connected position, said illuminating means being so arranged that in series the light of intensity is comfortable to the human eye and in parallel the light intensity is sufficient to illuminate either the opaque copy material on the base or the mounted transparency to a degree that either may be photographed.

References Cited in the file of this patent

UNITED STATES PATENTS

| | | |
|---|---|---|
| 1,572,899 | Mastrukoff | Feb. 16, 1926 |
| 2,042,005 | Hutchings | May 26, 1936 |
| 2,050,571 | Johnson | Aug. 11, 1936 |
| 2,474,055 | Lacey | June 21, 1949 |
| 2,821,882 | Goodkin | Feb. 4, 1958 |
| 3,065,667 | Edgerton | Nov. 27, 1962 |
| 3,076,378 | Biedermann et al. | Feb. 5, 1963 |

FOREIGN PATENTS

| | | |
|---|---|---|
| 39,777 | Norway | Sept. 22, 1924 |
| 298,250 | Germany | Mar. 28, 1916 |
| 590,559 | France | Mar. 20, 1925 |